United States Patent [19]

Gustafsson

[11] Patent Number: 5,530,729
[45] Date of Patent: Jun. 25, 1996

[54] FUEL ASSEMBLY AND SPACER FOR A BOILING REACTOR

[75] Inventor: Tommy Gustafsson, Köping, Sweden

[73] Assignee: ABB Atom AB, Vasteras, Sweden

[21] Appl. No.: 304,481

[22] Filed: Sep. 12, 1994

[30] Foreign Application Priority Data

Sep. 17, 1993 [SE] Sweden .................................. 9303047

[51] Int. Cl.⁶ ...................................................... G21C 3/34
[52] U.S. Cl. ......................... 376/439; 376/438; 376/443; 376/441; 376/454
[58] Field of Search ..................... 376/439, 438, 376/443, 441, 454; 976/DIG. 60, DIG. 78, DIG. 75

[56] References Cited

U.S. PATENT DOCUMENTS

| | | | |
|---|---|---|---|
| 4,666,663 | 5/1987 | Steinke | 376/441 |
| 4,683,115 | 7/1987 | Fromel et al. | 376/439 |
| 4,728,490 | 3/1988 | Taleyarkhan | 376/439 |
| 4,957,697 | 9/1990 | Wada | 376/442 |
| 5,089,220 | 2/1992 | Nylund | 376/439 |
| 5,096,660 | 3/1992 | Hembjer et al. | 376/438 |
| 5,278,883 | 1/1994 | Patterson et al. | 376/439 |
| 5,404,383 | 4/1995 | Nylund | 376/438 |

Primary Examiner—Donald P. Walsh
Assistant Examiner—Meena Chelliah
Attorney, Agent, or Firm—Watson, Cole, Grindle & Watson

[57] ABSTRACT

A fuel assembly and a spacer for a boiling reactor comprises an elongated fuel channel which is connected to a coolant intended to flow therethrough. In the fuel channel there is arranged a bundle of also elongated fuel rods retained by a plurality of spacers. The spacers have an external spacer frame which is provided all around with a plurality of openings. There is arranged, at the inside of the spacer frame, an edge which is obliquely positioned in relation to the longitudinal direction of the fuel assembly and which extends in an inclined manner in a direction downstream of the spacer and toward the corner of the spacer to deflect coolant to the fuel rods arranged at these corners.

10 Claims, 4 Drawing Sheets

FUEL ASSEMBLY AND SPACER FOR A BOILING REACTOR

TECHNICAL FIELD

The present invention relates to a fuel assembly and a spacer for a boiling reactor. The fuel assembly comprises a bundle of elongated fuel rods retained and fixed by a plurality of spacers arranged in a certain spaced relationship to each other along the bundle. The spacers comprise a plurality of cells to mutually fix the fuel rods and are surrounded by an external spacer frame. A coolant, for example water, is adapted to flow from below and up through the normally vertically arranged fuel assembly and, during a nuclear reaction, to cool the fuel rods arranged in the assembly. The object of the invention is to increase the efficiency in this cooling of the fuel rods, in particular the fuel rods which are arranged at the corners of the spacer.

BACKGROUND ART, PROBLEMS

A fuel assembly in a nuclear reactor consists of an elongated tubular container, often with a rectangular or square cross section, which is open at both ends forming a continuous flow passage, through which the coolant of the reactor is able to flow. The fuel assembly comprises a larger number of also elongated tubular fuel rods, arranged in parallel in a certain definite, normally symmetrical pattern. At the top, the fuel rods are retained by a top tie plate and at the bottom by a bottom tie plate. To allow coolant in the desired manner to flow past the fuel rods, it is important that these be kept at a distance from each other and prevented from bending or vibrating when the reactor is in operation. For this purpose, a plurality of spacers are used, distributed along the fuel assembly in the longitudinal direction.

Known spacers often comprise an external spacer frame and, inside this spacer frame, plate bands arranged crosswise and standing on end, these plate bands forming substantially square cells. It is also common for the cells to be formed from sleeves. Inside the cells there are arranged fixed and resilient supports, respectively, for the fuel rods extending through the cells.

Since the coolant in a nuclear reactor of boiling-water type (BWR) boils, a ratio of water to steam is formed which varies axially in the core. The coolant flows from the bottom and upwards in the core. At the bottom of the core, the temperature of the cooling water is lower than the boiling temperature and is thus in single phase, that is, the space between the fuel rods in the lower part of the assembly is, in operation, filled with non-boiling water. Further up, where the coolant has reached the boiling temperature, water is transformed into steam and the coolant is in two phases. The further up in the core, the higher the proportion of steam in relation to the proportion of water. In the upper part of the core, the fuel rods are only covered with a thin film of water, outside of which steam mixed with water droplets flows.

If the heat flux from a fuel rod becomes very large in relation to the coolant flow, there may be a risk of dryout occurring, that is, the liquid film becomes so thin that it is not able to hold together. The liquid film is broken up and dry wall portions are formed, which locally leads to a considerably deteriorated thermal transmittance between the fuel rod and the coolant, resulting in a greatly increased wall temperature of the fuel rod. The increased wall temperature may lead to damage with serious consequences arising on the fuel rods. The risk of dryout is greatest in the upper part of the fuel where the percentage of steam is greatest.

Also the wall of the fuel assembly, that is, the inside of that fuel channel which surrounds four identical bundles of fuel rods retained by spacers, is coated by a water film. However, this film is not entirely necessary since the wall of the fuel channel is considerably more insensitive to superheating than the fuel rods.

The spacers influence the flow of the coolant and hence the cooling of the fuel. It is known that, in a region just below the spacer where the coolant has not yet passed the spacer, a deterioration of the water film on the fuel rods takes place, whereas in region above the spacer, where the coolant has just passed the spacer, a reinforcement of the water film instead occurs. The reinforcement of the water film is due to the turbulence which arises in the coolant when it passes a spacer. The greatest risk of dryout exists in the upper part of the fuel just below the spacers.

A limiting factor with respect to the dryout power, that is, the total power that can be obtained from the fuel assembly without the risk of dryout existing, is usually the power that is obtainable from the fuel rods arranged in the corners of the spacer. These fuel rods, in the following referred to as corner rods, are sensitive since they are surrounded by only a small quantity of coolant, which limits the load possibility while at the same time non-boiling water with a good moderating capacity is present outside the corners of the fuel channel, whereby the power in the corner rods tends to become too high. A lower power output from the corner rod can be achieved with a lower enrichment thereof. However, it is not desirable to lower the enrichment level too much since, at the same time, a uniform enrichment design in the fuel assembly and as high a power output as possible are aimed at.

One way of improving the cooling is to reduce the distance between the spacers, such that the distance becomes small in the upper half of the fuel bundle where the sensitivity is greatest. However, this requires that the pressure drop in the coolant does not increase too much across the spacers such that the cooling capacity decreases. Normally, the positive cooling capacity of a spacer does not reach all the way up to the next spacer. Dryout occurs, as described above, exactly below the nearest downstream spacer. When an extra spacer level is introduced in the bundle, the total pressure drop should not increase in the fuel bundle, which means that the pressure drop of the individual spacer in such a case must be reduced.

One object of the invention is to improve the cooling of the fuel rods, in particular of the fuel rods which are arranged at the corners of the spacers, and to improve the cooling of at least the upper part of the fuel rods so as to reduce the risk of dryout. A reduced risk of dryout means that the fuel can be utilized more efficiently, which entails economical advantages.

SUMMARY OF THE INVENTION, ADVANTAGES

The present invention relates to a fuel assembly and a spacer for a boiling water reactor in which the cooling of at least its upper part is improved and in particular of the corner rods of the spacers such that the risk of dryout is reduced. The improved cooling is achieved by designing at least some of the spacer frames of the fuel assembly as will be hereinafter described.

The spacer frame according to the invention comprises a first portion arranged at a distance from the inner surface of the fuel channel in the fuel assembly, and a second portion which, compared with the first portion, is arranged at a shorter distance from the inner surface of the fuel channel. The spacer frame normally consists of four rectangular frame parts which are joined together at their respective short sides with a pitch angle of 90°, forming a spacer frame for surrounding the spacer cells. The second portion is, at the corners of the spacer frame, that is, at the short side of each frame part, adapted to conduct coolant into the inside of the frame part whereupon the coolant encounters an edge which is obliquely positioned in relation to the longitudinal direction of the fuel assembly and which is formed between the first and second portions and adapted such that the coolant is caused to be deflected in a direction towards the corner rod in that the obliquely positioned edge extends in an inclined manner in a direction downstream of the spacer and towards the immediately adjacent corner of the spacer. This deflection of the coolant towards the corner rod means that more coolant reaches the corner rods, which in turn means that the average power output from the fuel assembly can be increased.

Further, the spacer frame is provided at its corners with recesses, extending along the direction of flow, which are limited by an upper and a lower projecting part to connect one frame part to another, possibly via a cell. The reduction of material in the corner portion permits improved cooling of the corner rod through reduced friction, that is, lower flow resistance, between the coolant flowing upwards and the spacer frame and more coolant to the corner rod such that the power output therefrom can be increased without the risk of dryout increasing. The reduction of material also results in a reduced cross-section area in the direction of flow. All the frame parts are advantageously designed essentially identically.

The design of the frame part in other respects may be made in many different ways, some of which will be described below in connection with the description of the preferred embodiments.

At least the upper part of the fuel assembly is provided with the type of spacer described above, that is, that part of the fuel assembly where the coolant is situated in a high degree of two-phase state.

In those cases where more spacer levels are chosen than what the above-mentioned spacers are intended for, in order to reduce the total pressure drop, the lower part of the fuel assembly may be provided with low-pressure drop spacers. This method is possible since the risk of dryout does not exist there since the coolant is essentially in single-phase state.

The advantage of the fuel assembly and the spacer according to the invention is that they allow a more efficient cooling of especially the corner rods of the spacers, whereby the power output therefrom, and hence the power output from the entire fuel assembly, can be increased. Further, the cross-section area of the spacer frame in the direction of flow is minimized through, inter alia, the open corners, which allows a low pressure drop across the respective spacer, which in turn provides a possibility of insertion of additional spacer levels. In those cases where the spacer according to the invention in the fuel assembly is combined with any other type of spacer with a very low pressure drop, the pressure drop per spacer can be further reduced and further spacer levels be inserted.

BRIEF DESCRIPTION OF THE DRAWINGS

The invention will be most readily understood with reference to the accompanying drawings.

DESCRIPTION OF THE PREFERRED EMBODIMENTS

Figure 1:
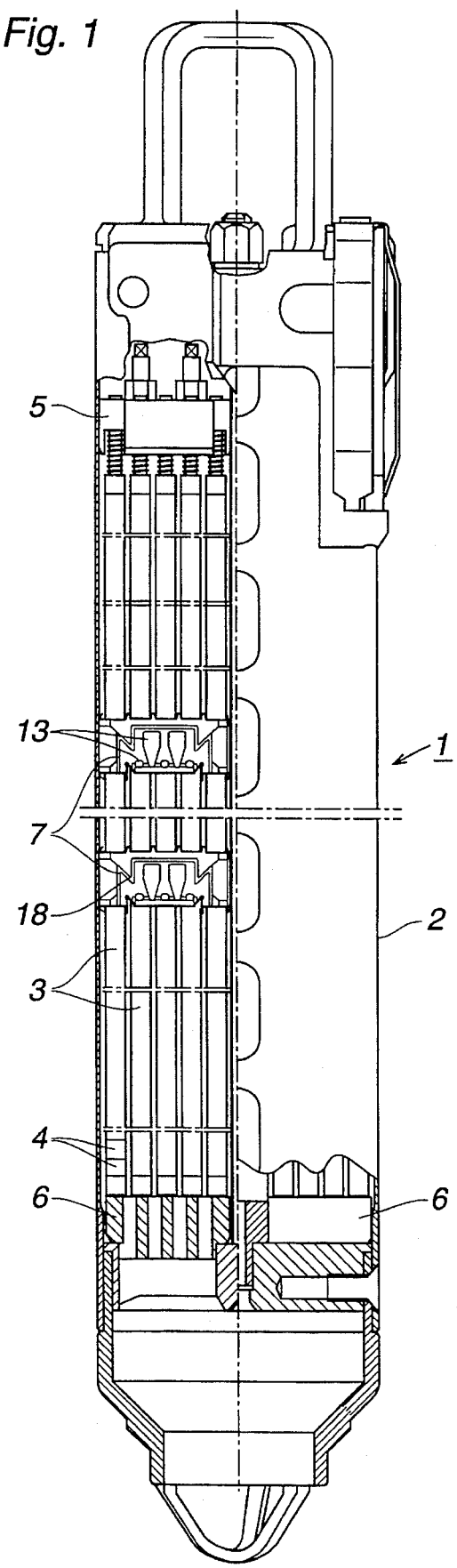
FIG. 1 shows a fuel assembly with spacers according to the invention.

FIG. 1 shows a fuel assembly 1 according to the invention which comprises an elongated tubular container, often of rectangular or square cross section, referred to as a fuel channel 2. The fuel channel 2 is open at both ends so as to form a continuous flow passage through which the coolant of the reactor flows. The fuel assembly 1 comprises a large number of also elongated tubular fuel rods 3, arranged in parallel, in which pellets 4 of nuclear fuel are arranged. The fuel rods 3 are retained at the top by a top tie plate 5 and at the bottom by a bottom tie plate 6. The fuel rods 3 are kept spaced from each other by means of spacers 7 and are prevented from bending or vibrating when the reactor is in operation.

A spacer 7 (FIG. 2a) comprises an outer spacer frame 8, with frame parts 8a–d, and cells 9 arranged inside frame 8. Inside these cells 9 there are arranged, for example, fixed and resilient supports (not shown), respectively, for the fuel rods 3 extending through the cells 9.

The spacer frame 8 usually comprises a plate band standing on end. At the upper part of the frame 8 a plurality of guiding tabs 12 are arranged in order to prevent the bundle, that is, the fuel rods 3 inserted into the spacers 7, from being wedged in the fuel channel 2 when being inserted into or withdrawn from the fuel channel 2. The guiding tabs 12 are formed from parts projecting from the downstream edge of the spacer frame 8, which tabs are bent toward the centre of the spacer 7 around a folding axis coinciding with the edge of the spacer, that is, an axis perpendicular to the direction of flow. The guiding tabs 12 result in the flow resistance of the spacer 7 increasing since a large part of its side surface is presented across the direction of flow. The increased flow resistance downstream of the spacer 7 is advantageous since it creates a certain turbulence which facilitates the heat transfer between the fuel rods 3 and the coolant and hence retains the coolant film along the fuel rods 3.

The spacer frame 8 is largely formed open at the bottom end by the arrangement of openings 13 and vertically folded tabs, referred to as guiding studs 14. The open bottom end permits excessive disturbance of the coolant flow to be avoided and permits the pressure drop across the spacer 7 to be limited.

The guiding studs 14 are intended to guide the bundle in the fuel channel 2. The guiding studs 14 comprise a plate tab or the like, the plane of which is arranged parallel to the direction of flow of the coolant and one side edge of which runs in an inclined manner from the lower edge of the frame 8 in a direction downstream of the spacer 7 towards the centre of the spacer 7. Since the side surface of the guiding stud 14 is arranged in parallel with the direction of flow, only the cross-sectional area of the guiding stud 14 perpendicular to the plane of the frame 8 and the direction of flow will constitute an obstacle to the flow the coolant through of bundle and will thus not give rise to any significant flow resistance.

The frame part 8 is provided with a first and a second portion 15, 16 arranged at different distances from the inner surface of the fuel channel 2, forming a spacing element between the bundle of fuel rods 3 and the inner surface of the fuel channel 2 in the fuel assembly 1. The second portion 16 constitutes a bulge in a direction towards the fuel channel 2, whereby it is located at a shorter distance from the fuel channel 2 than the first portion 15.

Figure 2A:
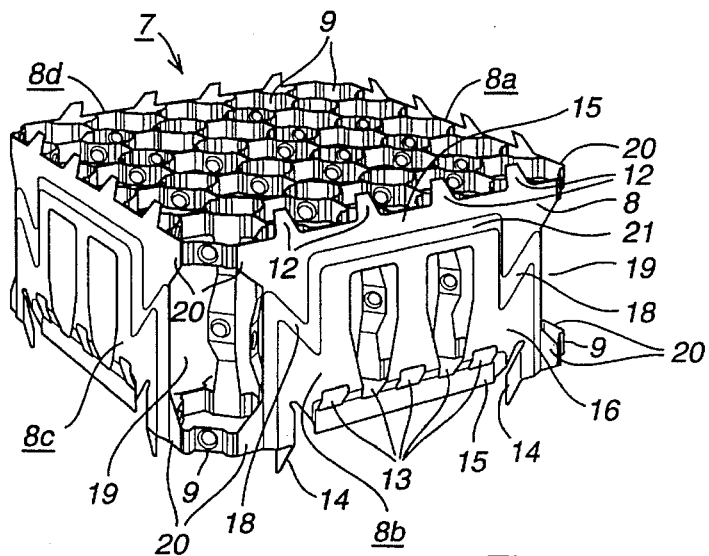
FIGS. 2a–b show perspective views of a spacer frame according to the invention, which frame surrounds a lattice of cells.
Figure 2B:
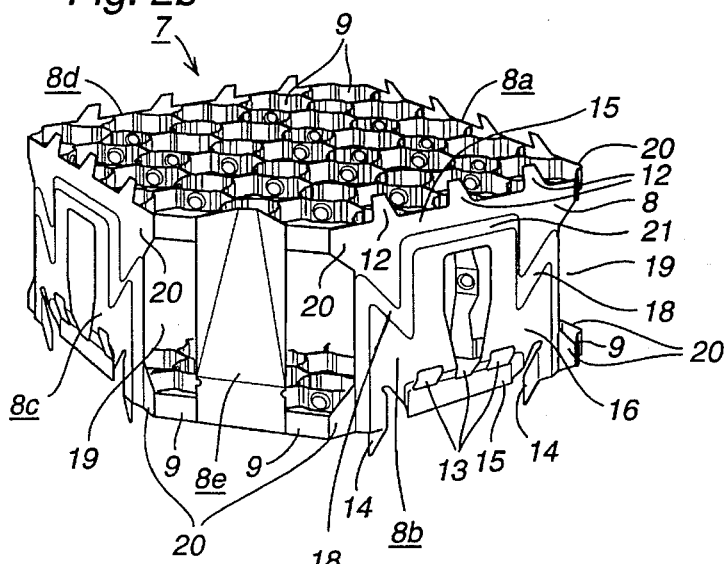

FIG. 2*b* shows an alternative embodiment of the spacer 7 shown in FIG. 2*a*. The spacer 7 in FIG. 2*b* is intended to be used in a fuel assembly 1 comprising at least one position which is not occupied by a rod and which is located in a corner. The spacer 7 can then be adapted with a reduced corner portion and an extra frame part 8*e*. The frame part 8*e* comprises a long flat surface inclined towards the spacer centre for guiding water to the fuel rods 3.

Figure 3:
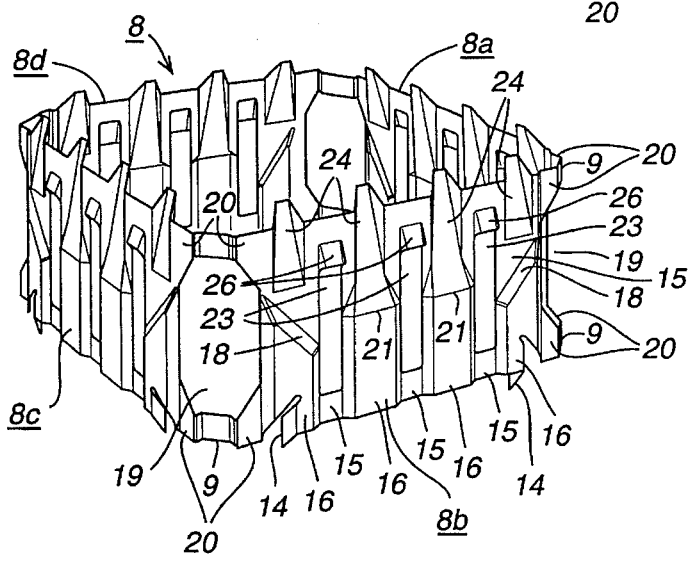
FIG. 3 shows a perspective view of an alternative embodiment of a spacer frame.

From FIGS. 2*a*, 2*b* and 3 it is clear that at the lower edge of the frame 8, the openings 13 and 23, respectively, are adapted to lead in coolant which flows upwardly along the fuel channel 2 to the inside of the spacer frame 8. At the corners of the frame 8 the coolant is led to the inside of the spacer frame 8 via the openings at the folded-in guiding studs 14. The coolant is led to an edge 18 which is obliquely positioned in relation to the longitudinal direction of the fuel assembly 1 and formed between the first and second portions 15, 16, which edge 18 causes the coolant to be deflected in a direction towards that fuel rod 3 which is arranged at the corners of the spacer frame 8. The oblique edge 18 extends in a direction downstream of the spacer 7 and towards the corners of the spacer frame 8.

The short side of the frame part 8*b* is provided at the corner with a recess 19, extending along the direction of flow, which is limited at top and bottom by projecting parts 20 which are intended to form cells 9 at the four corners of the spacer frame.

FIGS. 2*a* and 2*b* show an embodiment of a spacer frame 8 in which, at the mid-portion of a frame part 8*b*, the coolant is introduced into the inside of the frame 8 via the openings 13 and further upwards along the spacer frame 8 until it encounters an edge 21, extending transversely of the longitudinal direction of the fuel assembly 1 and formed between the first and second portions 15, 16, whereby the coolant is slowed down and directed inwardly toward the fuel rods 3 while the pressure is reduced. In the second portion 16, bottle-like openings are also arranged, partly in order to save material, with the "bottle-neck" facing downwardly and the "bottle-bottom" facing upwardly. These bottle-like openings constitute an extension in the downstream direction of some of the openings 13 and assist in conducting coolant to the inside of the frame 8 at the "bottle-bottom"

FIG. 3 shows another embodiment of a spacer frame 8 which, like the one shown in FIG. 2, is provided with a first and a second portion 15, 16, wherein the first portion 15, in the fuel assembly 1, is arranged at a larger distance from the fuel channel 2 than the second portion 16. The mid-portion of the frame part 8*a* is provided with alternately first and second portions 15, 16 arranged in parallel with the direction of flow, where in the first portions 15 openings 23 are arranged in which coolant is conducted, with the aid of guiding hoods 26, into the inside of the frame 8. The coolant is also led to the inside of the frame part 8*a* via the lower edge of the second portions 16, whereupon it flows upwards until it encounters an edge 21 formed between the first and second portions 15, 16 which is arranged in a direction across the direction of flow, whereby the coolant flow is deflected towards the centre of the spacer 7 for cooling the centrally arranged fuel rods 3. To further facilitate this deflection, a long flat guiding surface 24, inclined inwards towards the centre of the spacer, is connected to the second portion 16. The long and flat angle ensures a low pressure drop and the guiding surfaces have good mechanical strength when lifting out the spacers 7, and the fuel rods 3 arranged therein, from the fuel channel 2.

Figure 4:
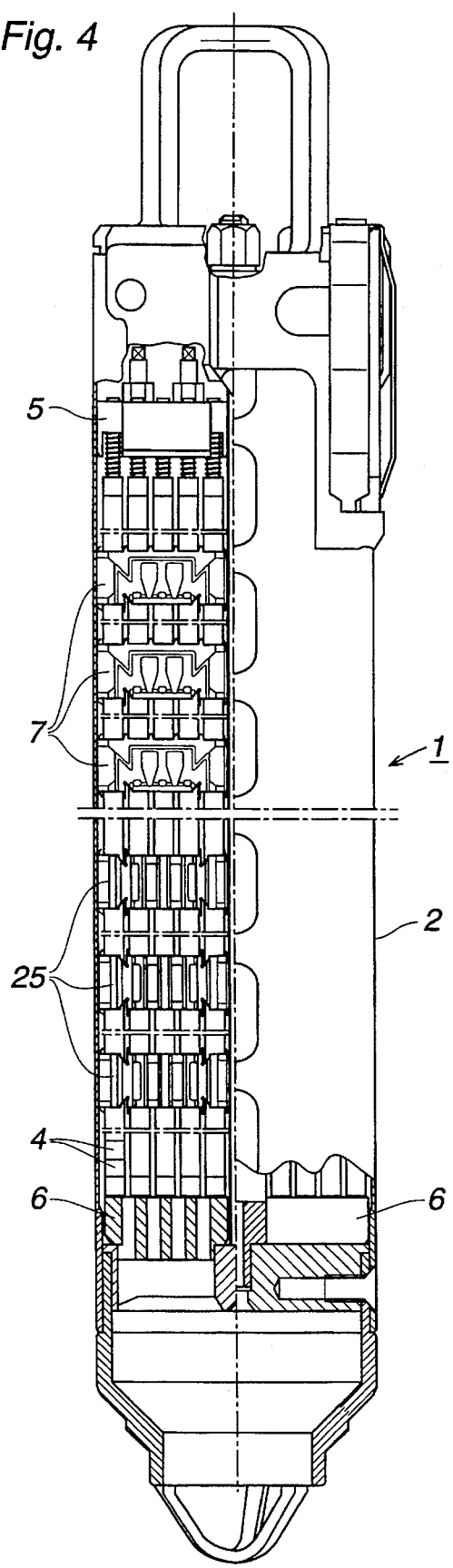
FIG. 4 shows a fuel assembly with spacers of different types arranged in the upper and lower parts, respectively.
Figure 5A:
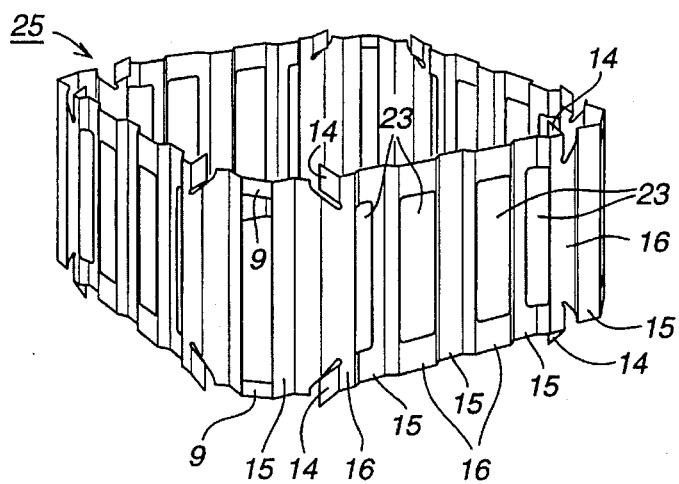
FIGS. 5a–c show perspective views of different embodiments of spacer frames for low-pressure drop spacers.
Figure 5B:
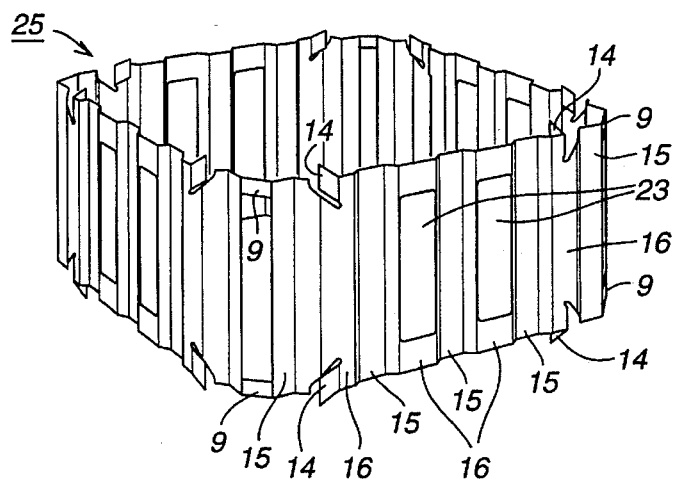
Figure 5C:
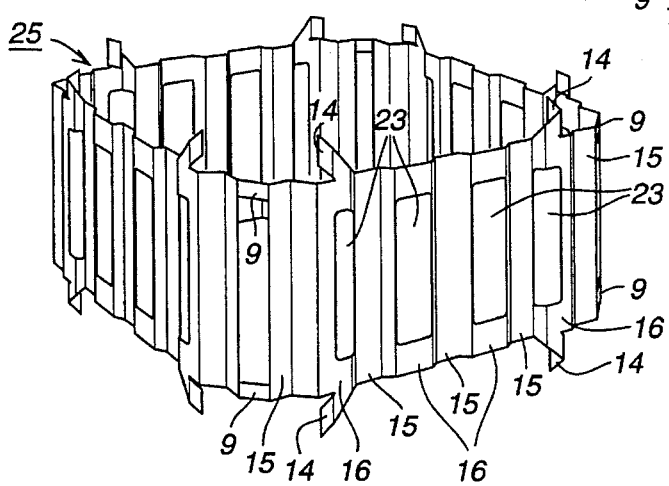

FIG. 4 shows an advantageous embodiment of the invention in which, in the lower part of a fuel assembly 1, spacers 7 with a low pressure drop are arranged, so-called low-pressure drop spacers. The frames 25 of the low-pressure drop spacers may, for example, be designed as shown in FIGS. 5*a–c*. These low-pressure drop spacer frames likewise comprise a first and a second portion 15, 16, wherein the first portion 15, in the fuel assembly 1, is arranged at a larger distance from the inner surface of the fuel channel 2 than the second portion 16. The spacer frame 25 alternately comprises the vertically positioned first and second portions 15, 16. The frame 25 comprises openings 23 in order to reduce the amount of material. Both at the top and the bottom the low-pressure spacer frame is provided with folded-in guiding studs 14 intended for guiding the fuel rods 3 and the spacer 7 when they are inserted into, or withdrawn from, the fuel channel 2. The guiding studs 14 are arranged in parallel with the flow whereby the flow resistance of the spacer 7 is minimal.

It is suitable to construct the spacer frames of the material inconel or of zircaloy.

I claim:

1. A spacer for retaining, at a plurality of levels, elongated fuel rods surrounded by a fuel channel through which coolant is arranged to flow downstream in a fuel assembly for a boiling water reactor, said spacer comprising a plurality of cells including corner portions for accommodating the fuel rods which are surrounded by an external spacer frame which is provided all around with a plurality of openings through which the coolant is directed to the inside of the spacer frame, wherein the external spacer frame comprises a first portion in the fuel assembly arranged at a distance from the inner surface of the fuel channel and a second portion arranged at a shorter distance from the fuel channel compared with the first portion, and that on the inside of the frame, between the first and second portions, there is formed an edge which is obliquely positioned in relation to the longitudinal direction of the fuel assembly, said edge communicating with at least one of such openings located at the corner portions, the edge being inclined in a downstream direction toward each of the corner portions for directing the coolant toward the fuel rods arranged at the corner portions of the spacer.

2. A spacer according to claim 1, wherein at at the corner portions of the spacer frame, there are arranged recesses which are limited at top and bottom by projecting parts.

3. A spacer according to claim 1, wherein, at the lower edge of the spacer, guiding studs are arranged comprising a plate tab or the like, the plane of which is arranged parallel to the flow direction of the coolant and one side edge of which extends in an inclined manner from the lower edge of the frame in a direction upstream of the spacer towards the centre of the spacer.

4. A spacer according to claim 1, wherein the spacer comprises a further edge formed between the first and second portions extending in a direction transverse to the direction of flow.

5. A spacer according to claim 4, wherein the spacer comprises a guiding surface which comprises a long, flat plane inclined in a direction toward the centre of the spacer and extends downstream of the spacer starting from the further edge.

6. A spacer according to claim 4, wherein, in the second portion, there is arranged at least one bottle-like opening which constitutes an extension of one of said plurality of openings downstream of the spacer.

7. A spacer according to claim 1, wherein, in at least one corner, the spacer comprises a long, flat surface inclined inwardly toward the centre of the spacer.

8. A fuel assembly for a boiling water reactor with an upper part with coolant in two-phase state and a lower part with coolant essentially in single-phase state, said fuel assembly comprising an elongated fuel channel connected to a coolant intended to flow downstream through the fuel channel, a bundle of elongated fuel rods arranged in the fuel channel and retained by a plurality of spacers arranged at different levels along the bundle, each one of said spacers comprising a plurality of cells including corner portions for accommodating the fuel rods, said cells being surrounded by an external spacer frame which is provided all around by a plurality of openings through which the coolant is directed to the inside of the spacer frame, wherein the fuel assembly comprises at least one spacer which comprises a spacer frame with a first portion in the fuel assembly arranged at a distance from the fuel channel, and a second portion arranged at a shorter distance from the inner surface of the fuel channel compared with the first portion, and that on the inside of the frame, between the first and second portions, there is formed an edge which is obliquely positioned in relation to the longitudinal direction of the fuel assembly and which extends in an inclined manner in a direction downstream of the spacer (7) and toward the fuel rod (3) arranged in the corner of the spacer (7) said edge communicating with at least one of such openings located at the corner portions, the edge being inclined in a downstream direction toward each of the corner portions for directing the coolant toward the fuel rods arranged at the corner portions of the spacer.

9. A fuel assembly for a boiling water reactor with an upper part with coolant in two-phase state and a lower part with coolant essentially in single-phase state, said fuel assembly comprising an elongated fuel channel connected to a coolant intended to flow through the fuel channel, a bundle of also elongated fuel rods arranged in the fuel channel and retained by a plurality of spacers arranged at different levels along the bundle, each one of said spacers comprising a plurality of cells for accommodating the fuel rods, said cells being surrounded by an external spacer frame which is provided all around with a plurality of openings, wherein the upper part comprises at least one spacer according to claim 1 and the lower part comprises at least one low-pressure drop spacer.

10. A fuel assembly according to claim 9, wherein the low-pressure drop spacer comprises a first portion and a second portion, the first portion in the fuel assembly (1) being arranged at a larger distance from the inner side of the fuel channel than the second portion and wherein the first and second portions are arranged alternately and vertically positioned and that the low-pressure drop spacer both at top and bottom is provided with folded-in guiding studs comprising a plate tab or the like, the plane of which is arranged in parallel with the direction of flow of the coolant and one side edge of which extends in an inclined manner from the lower and upper edge of the frame, respectively, in a direction upstream and downstream of the low-pressure drop spacer, respectively, towards the centre of the low-pressure drop spacer.

* * * * *